United States Patent [19]
Kobayashi

[11] Patent Number: 5,873,067
[45] Date of Patent: Feb. 16, 1999

[54] WORK FLOW SYSTEM

[75] Inventor: Hitoshi Kobayashi, Tokyo, Japan

[73] Assignee: Kabushiki Kaisha Toshiba, Kawasaki, Japan

[21] Appl. No.: 598,867

[22] Filed: Feb. 9, 1996

[30] Foreign Application Priority Data

Feb. 14, 1995 [JP] Japan .................................. 7-025172
Feb. 14, 1995 [JP] Japan .................................. 7-025174

[51] Int. Cl.⁶ .................................................. G06F 17/60
[52] U.S. Cl. .................................................. 705/8
[58] Field of Search ........................ 705/8, 7, 9, 11; 395/200.68

[56] References Cited

U.S. PATENT DOCUMENTS

| | | |
|---|---|---|
| 5,216,592 | 6/1993 | Mann et al. . |
| 5,557,515 | 9/1996 | Abbruzzese et al. ............... 364/401 R |
| 5,581,691 | 12/1996 | Hsu et al. .......................... 395/182.13 |
| 5,675,745 | 10/1997 | Oku et al. ................................ 395/207 |

FOREIGN PATENT DOCUMENTS 5-89045  4/1992  Japan .

*Primary Examiner*—Kevin J. Teska
*Assistant Examiner*—Matthew Loppnow
*Attorney, Agent, or Firm*—Finnegan, Henderson, Farabow, Garret & Dunner, L.L.P.

[57] ABSTRACT

A work flow system is disclosed which, when a work effort is divided into multiple work points for execution in each of domains (sections or departments in enterprises, government offices, or the like), permits easy work allocation to work points in another domain. Each domain has a public flow management section for storing a public flow which consists of its own work points which is made open to another domain and, when detecting a public flow consisting of work points that belong to another domain in a flow indicating work originating in it, sends identification information for that public flow to that domain. Upon receipt of identification information for a public flow consisting of work points that belong to it from another domain, each domain carries out the public flow.

14 Claims, 17 Drawing Sheets

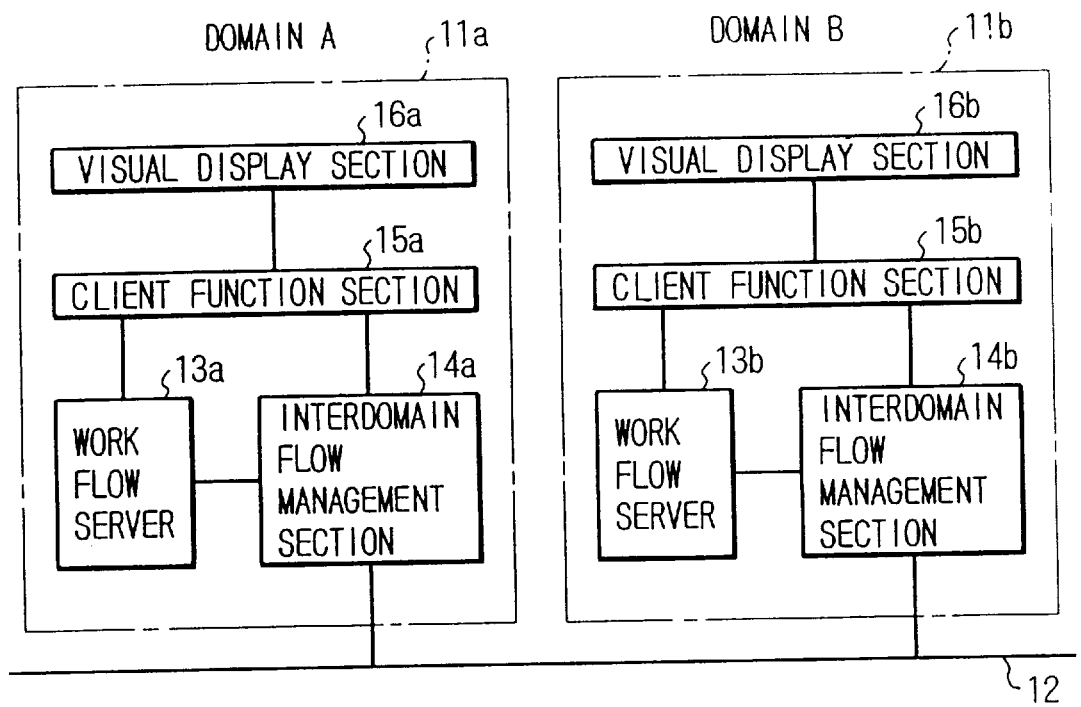
F I G. 1
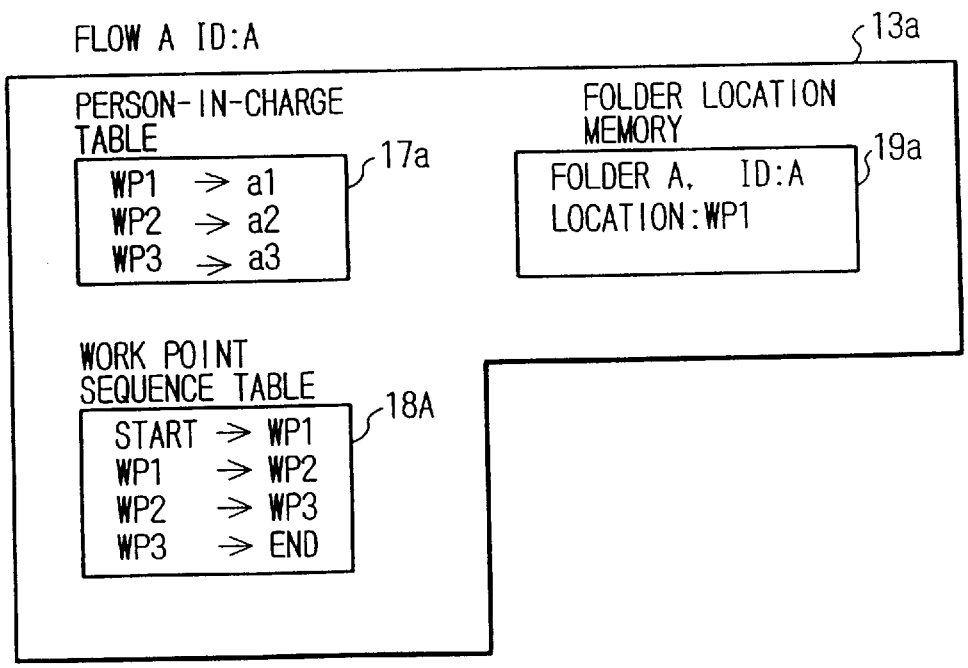
F I G. 2

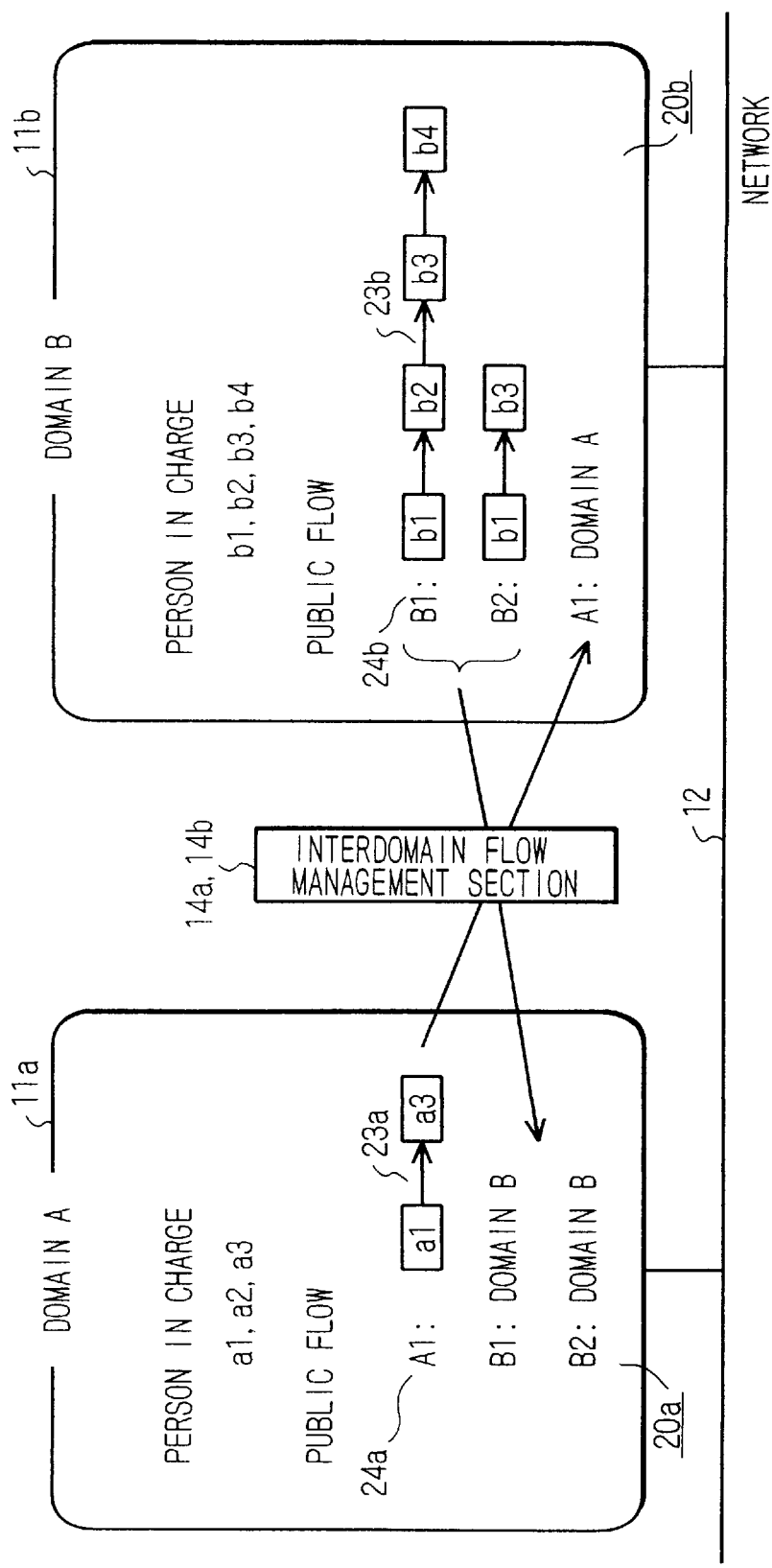
F I G. 6

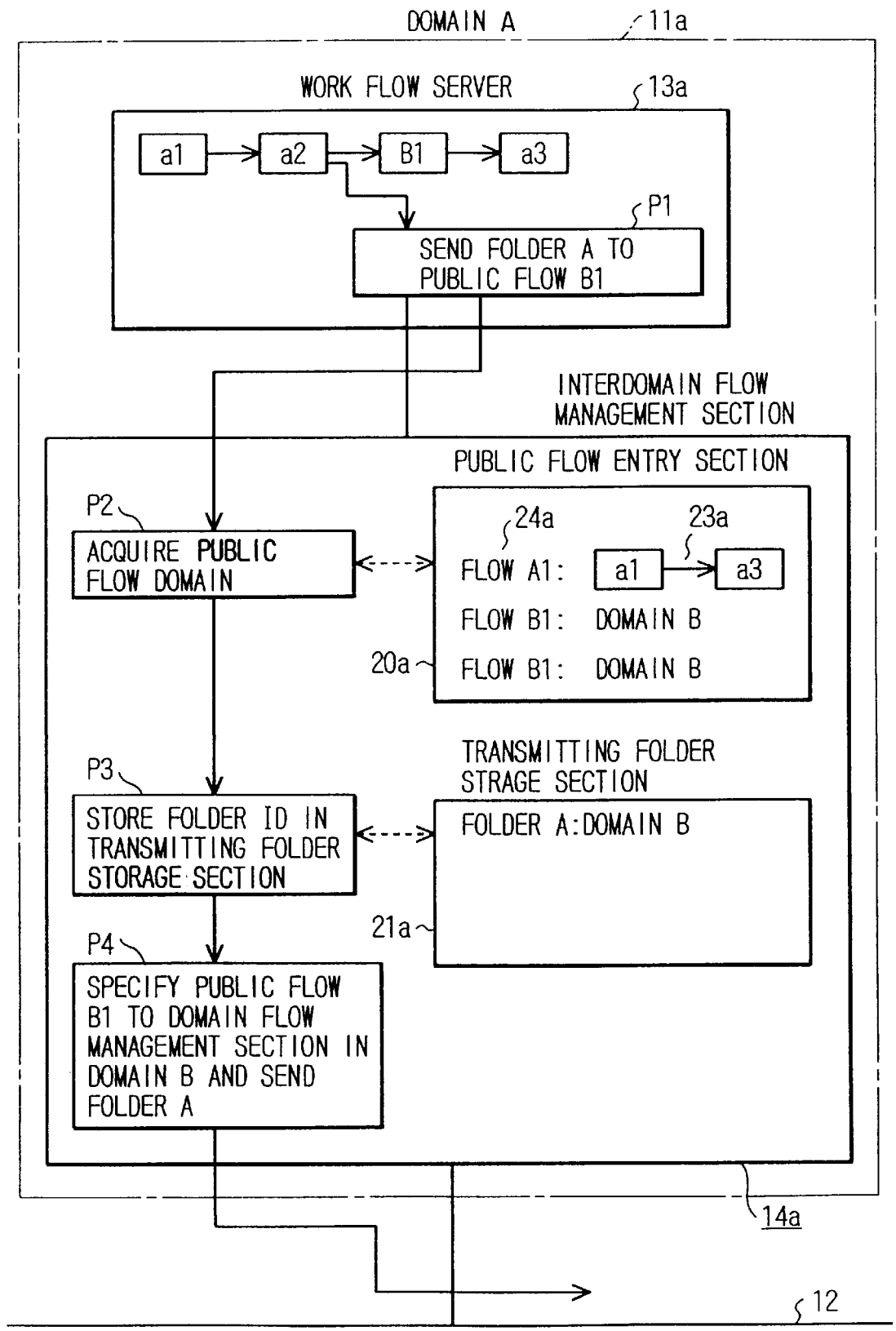
F I G. 7

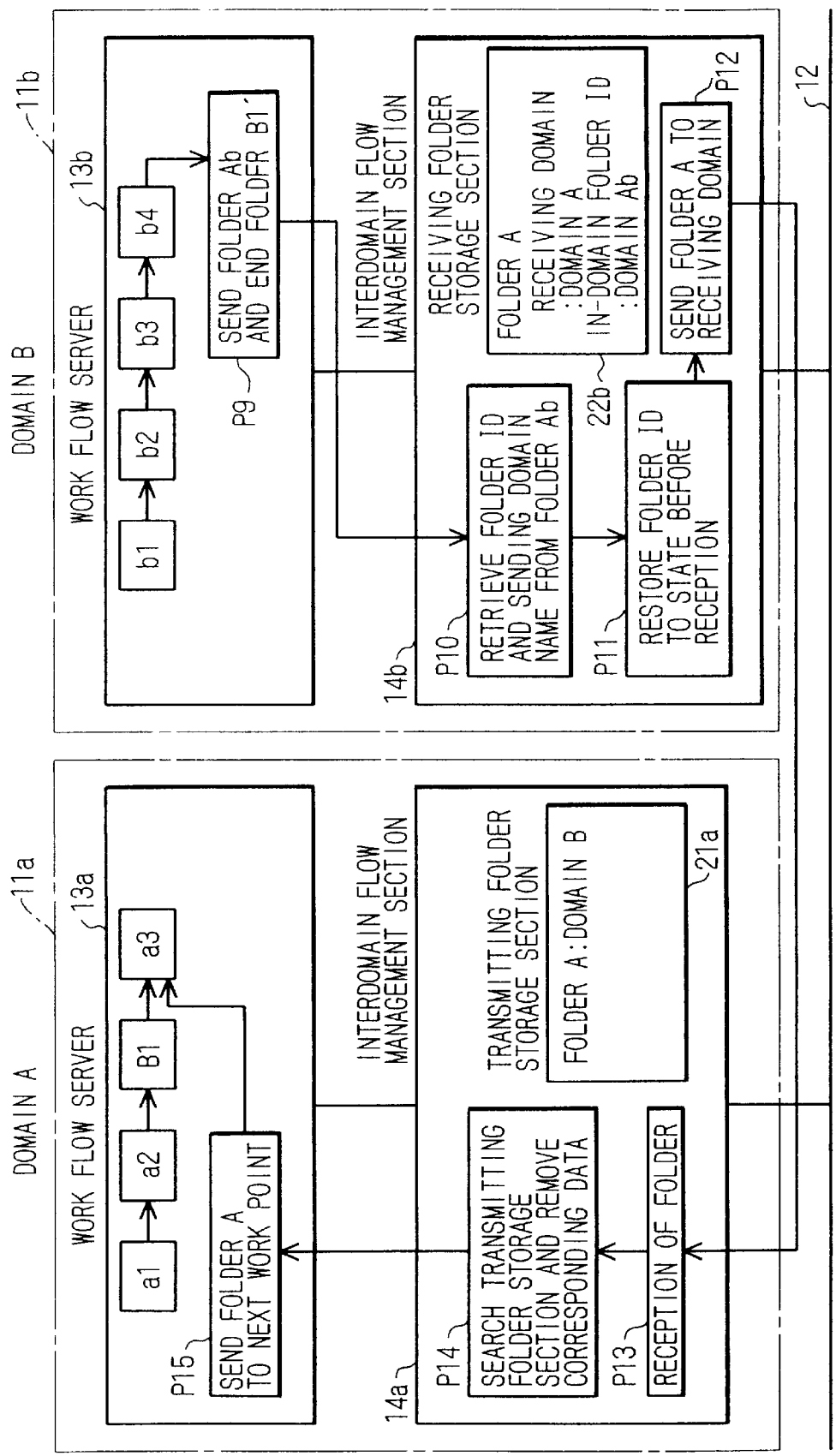
F I G. 9

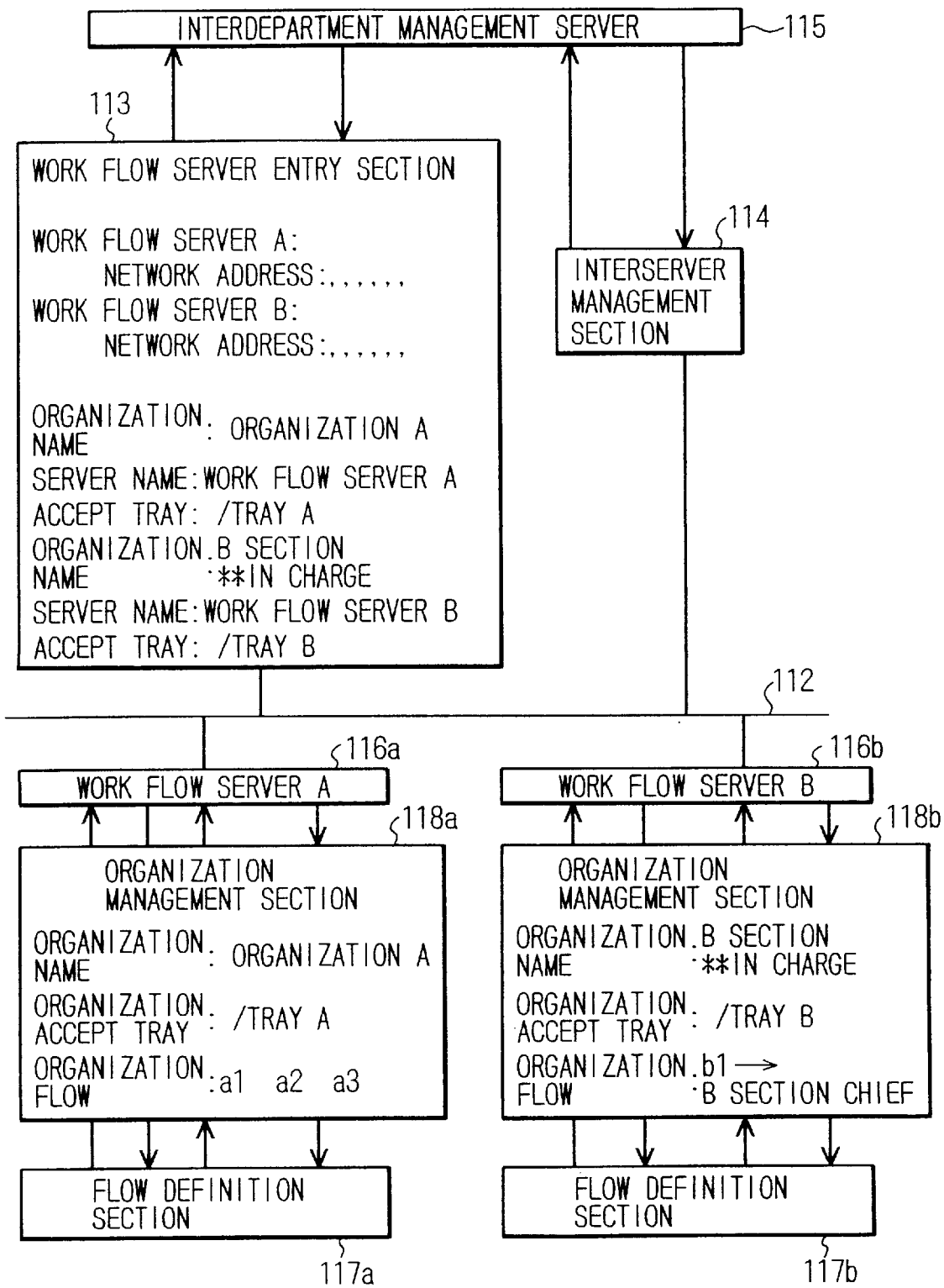
F I G. 13

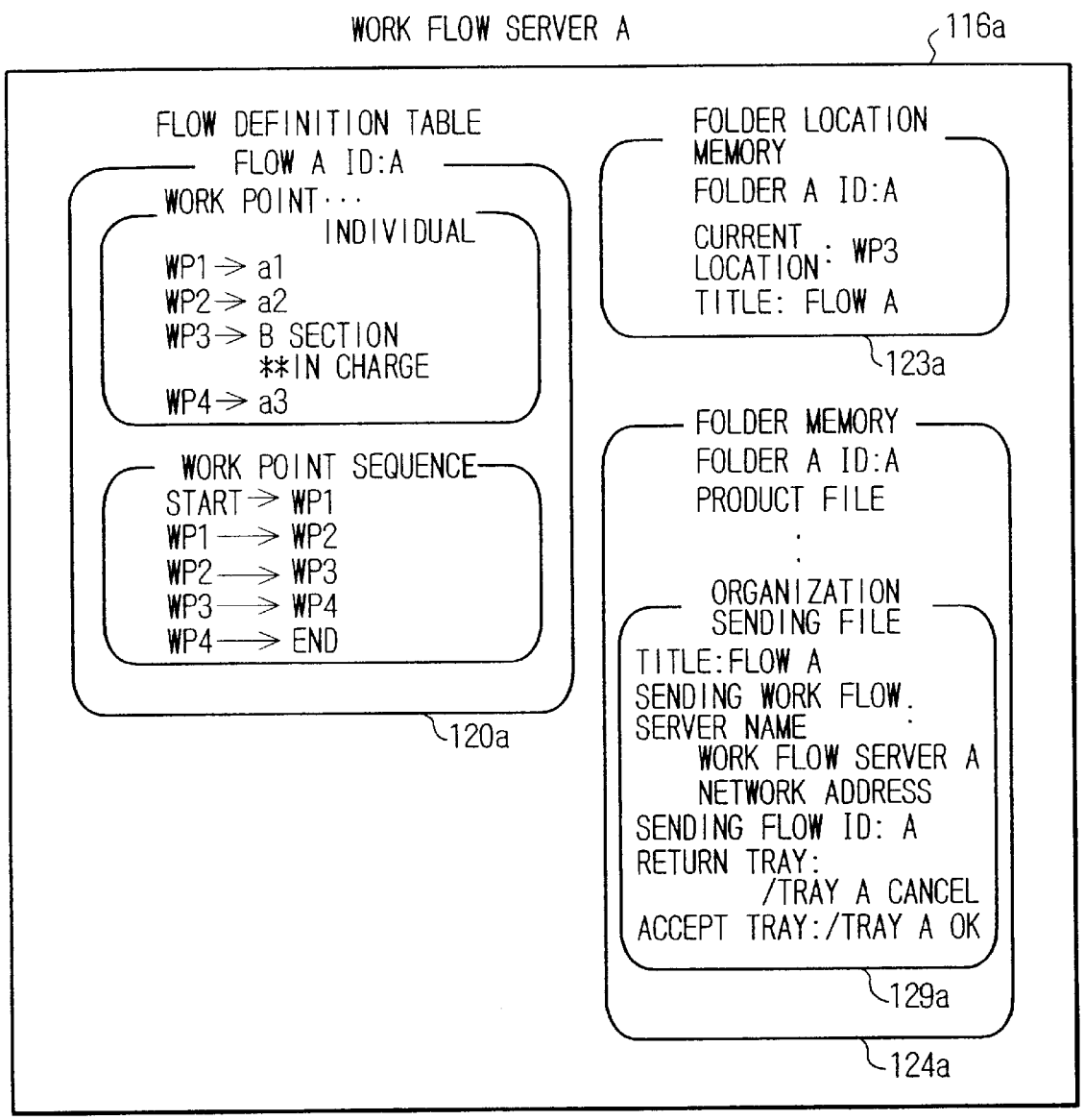
F I G. 19

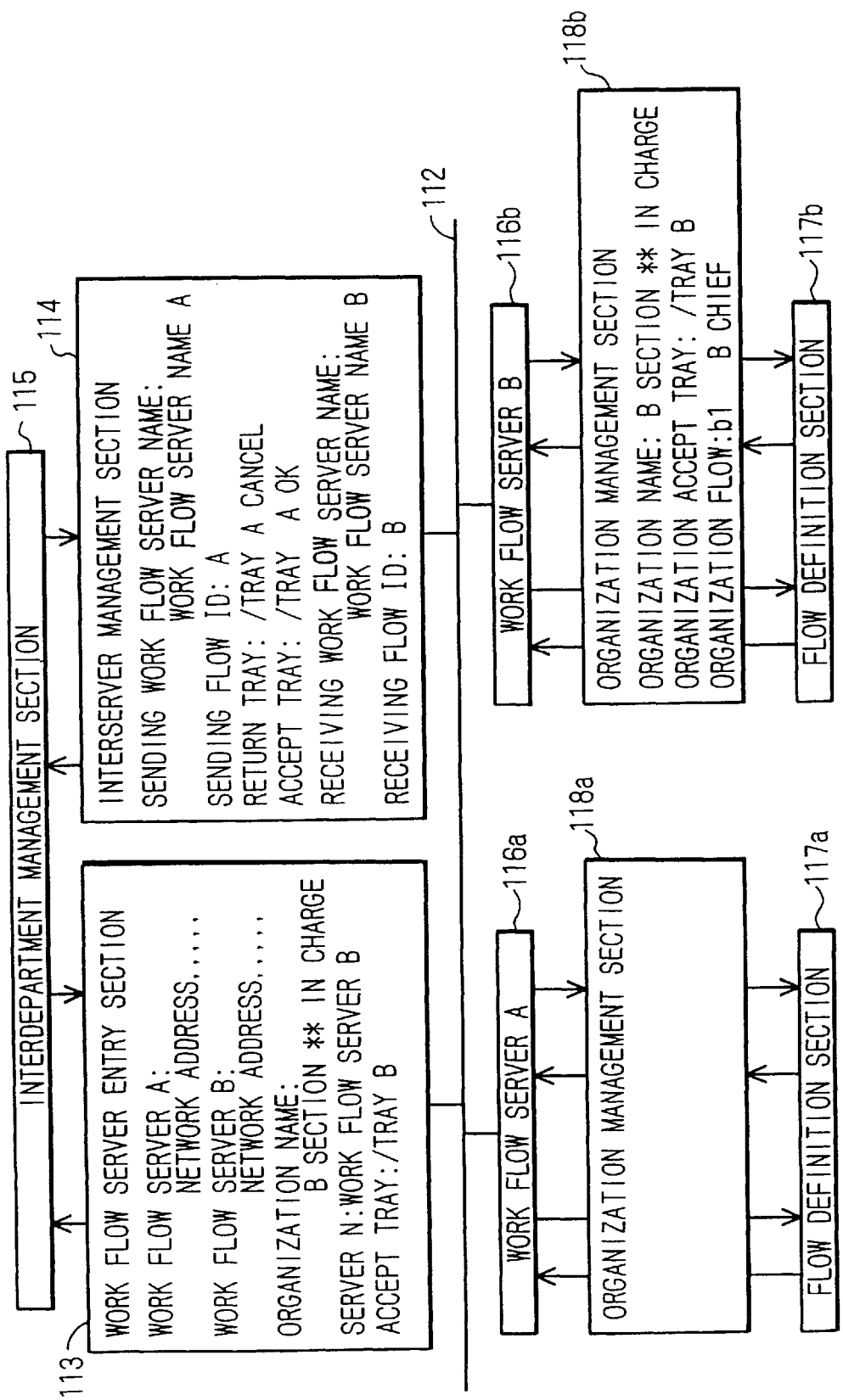
F I G. 21

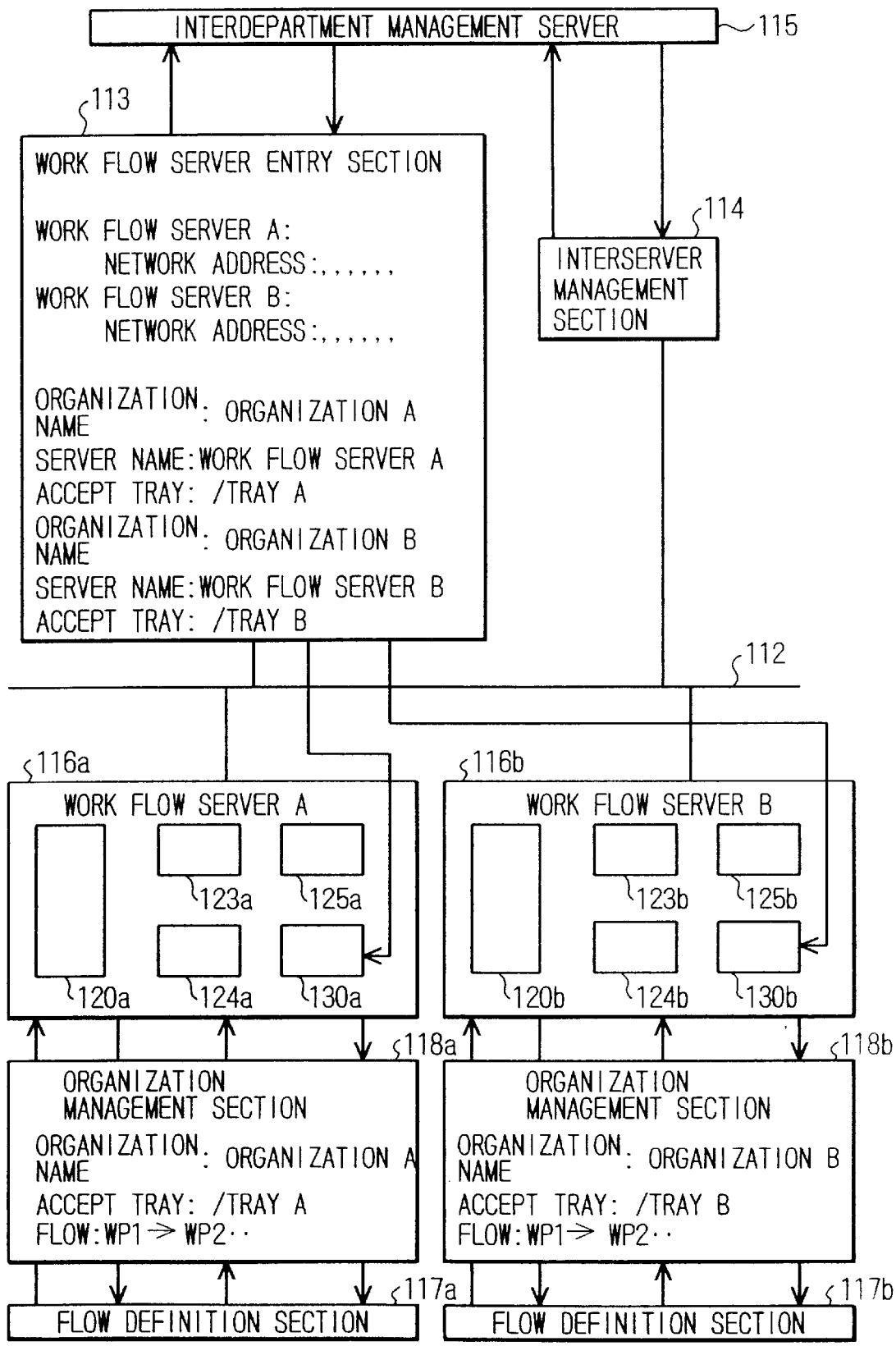
F I G. 23

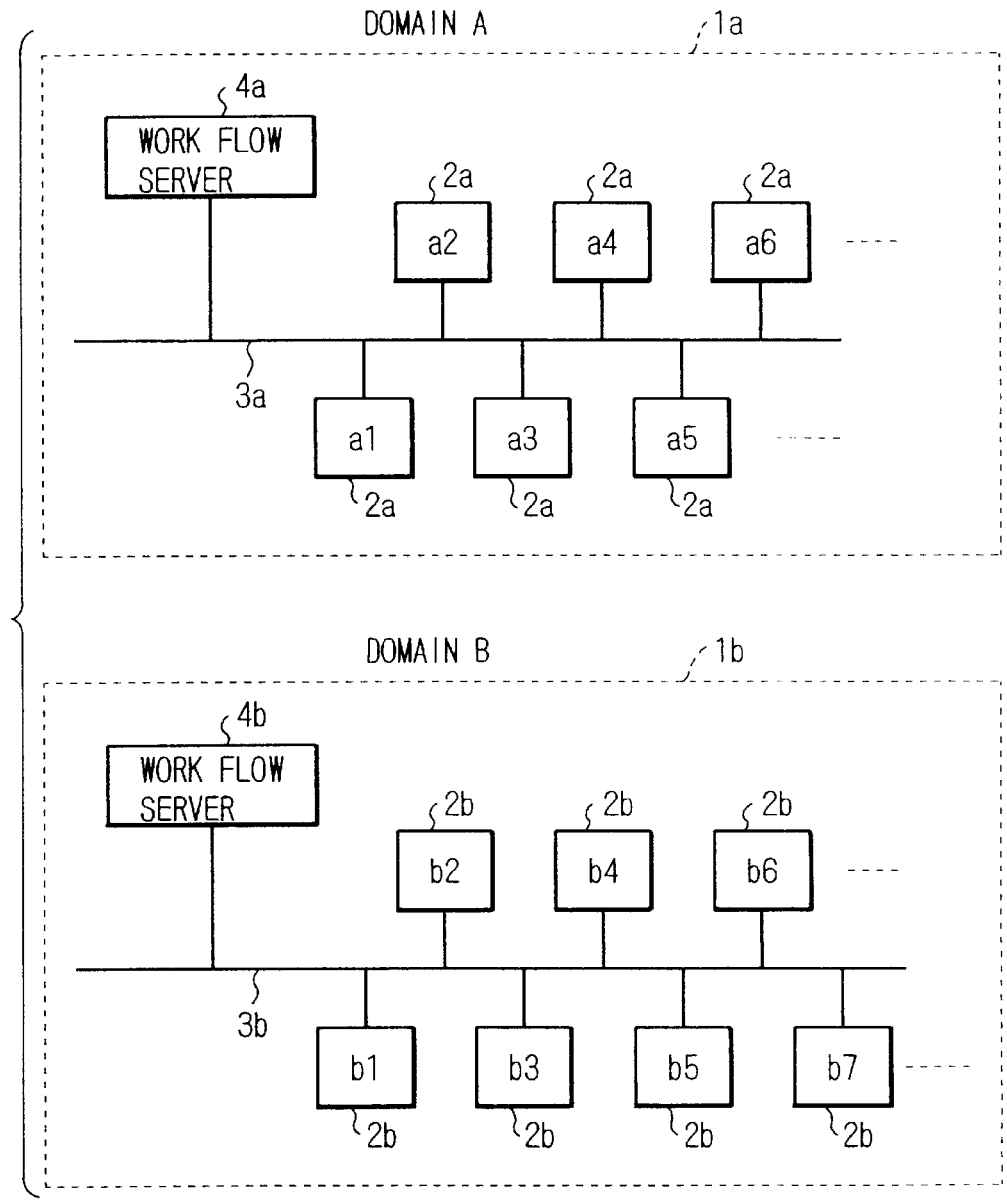
F I G. 24
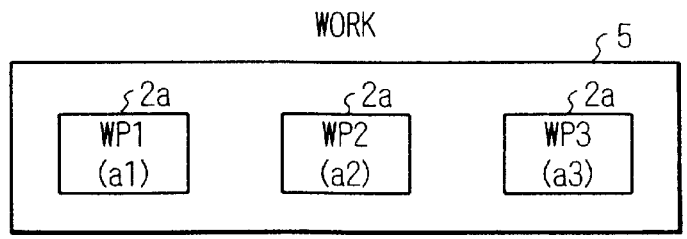
F I G. 25

WORK FLOW SYSTEM

BACKGROUND OF THE INVENTION

1. Field of the Invention

The invention relates to a work flow system for managing work flow using a computer system, and more specifically to a work flow system for managing a work flow extending over a plurality of domains.

2. Description of the Related Art

In enterprises, government offices, and the like, in order to carry out efficiently work that originates, it is divided into a plurality of unit tasks. Each unit task is allocated to a specific person (user) in charge of carrying out it.

The same can be said of various tasks to be carried out by a computer. Each work is divided into a plurality of unit tasks called work points which are allocated to client computers. A work flow system is defined as a system for managing the flow of forwarding to a person in charge (user) allocated to a work point a folder that was created at the previous stage to contain a product of the corresponding unit task, such as a document, drawing, program, or the like, or forwarding a folder that contains a product obtained at that work point to the next work point.

Specifically, at each work point, a person in charge allocated to it performs predetermined processes of reading, editing, adding, and the like on a folder forwarded to him or her and, at the termination of processes allocated to him or her, sends that folder to the next work point in accordance with the flow defined in a work flow server.

The operation of forwarding a folder to the next work point means moving that folder to an accept tray (a folder reception directory set up for each user) of a user allocated to that work point.

In such a work flow system, a unit to carry out tasks in enterprises, government offices, and the like is defined as an organization consisting of a section or department. This unit is referred to as a domain. Most of tasks originating in enterprises or government offices can be processed adequately within one organization (one domain).

FIG. 24 is a block diagram of a work flow system in which a section or department forms one domain. In each of domains 1*a* and 1*b*, a plurality of work points 2*a* (2*b*) that are allocated users a1, a2, a3, . . . , (b1, b2, b3, . . . ) is connected to a work flow server 4*a* (4*b*) by a transmission line 3*a* (3*b*). For example, when the flow 5 of a task comprised of multiple work points 2*a* (2*b*) is entered from outside as shown in FIG. 25, the work flow server 4*a* (4*b*) manages the execution of the flow 5.

Specifically, the work flow server 4*a* activates the first work point 2*a* (WP1) and, at the termination of processing at the work point 2*a*, forwards a folder created at the work point 2*a* to the next work point 2*a* (WP2) and activates that work point. At the termination of processing at the work point 2*a* (WP2), the work flow server forwards the folder to the next work point 2*a* (WP3) and activates that work point.

In this way, the work flow server 4*a* or 4*b* performs execution management of the work points 2*a* or 2*b* forming the flow 5 within its associated domain la or 1*b* and folder management at execution phases of the flow.

However, the work flow system shown in FIG. 24 has the following problem to be solved.

That is, since each of the work flow servers manages only work points incorporated into the domain to which it belongs, it cannot create the flow of work containing work points of the other domain.

To solve such a problem, it will be thought to combine the two domains 1*a* and 1*b* shown in FIG. 24 into one and manage all of tasks and all of the work points by means of a single work flow server. However, the execution management of all the work flows by means of a single work flow server will increase the burden of processing imposed on the server and result in an increase in flows waiting to be processed. The processing efficiency of the whole system will be reduced after all.

SUMMARY OF THE INVENTION

A first object of the invention is to provide a work flow system which, even if a work flow is created in such a way as to incorporate into part of work originating in one domain work to be carried out in the other domain, permits the work flow to be carried out efficiently in each domain, permits the kinds and scale of work to be handled by the system to be increased significantly, and permits each piece of work to be carried out efficiently.

A second object of the invention is to provide a work flow system which, when a work flow has been forwarded from one domain to the other domain and it is in execution in the other domain, permits the one domain to grasp the progress of the work flow in the other domain easily.

A third object of the invention is to provide a work flow system which permits a work flow to be carried out as normally as possible even in the event of abnormality to thereby improve the system reliability.

To attain the first object there is provided a work flow system which includes entry means for allocating a work point to each of persons in charge who belong to each of a plurality of domains; division means for dividing work originating in each domain into a plurality of work points; definition means for defining the execution sequence of work points for the work by a work flow; and management means for managing the execution of the work flow for each of the domains, and wherein each of the domains comprising: a public flow management section for storing a public flow consisting of its own work points, the public flow being made open to the other domains; product information sending means for, upon detecting a public flow which consists of work points that belong to another domain in the process of executing a work flow originated in it, sending a product at the current work point with identification information for the public flow to a domain to which work points forming the public flow belong; product information receiving means for receiving product information sent from another domain and containing identification information for a public flow consisting of its work points; and public flow executing means for executing the public flow identified by the identification information contained in the product information received by the product information receiving means.

In the work flow system thus configured, each domain stores a public flow which is made open to the other domain. The public flow of each domain is carried out by it by the other domain simply specifying identification information of the public flow, such as its name or identification code, and forwarding a product of a work point at the current point of time. That is, there is no need for the other domain to specify the work points forming the public flow and the execution sequence of the work points.

When a flow indicating work originating in a domain contains a public flow of the other domain, the domain sends the identification information and products of the public flow as product information to the other domain, whereupon the other domain carries out that public flow stored in it.

In this case, since the public flow of a domain consists of only its own work points, the flow is carried out in the same way as a general work flow consisting of its own work points is carried out. Thus, the processing of the public flow will not result in reduced processing efficiency. It is required that only product information containing products, or the results of processing of the public flow, be sent to the other domain.

Thus, since a flow indicating work contents themselves is not transmitted between domains, processing efficiency is not reduced even if a flow containing work points which belong to the other domain is created. The kinds and scale of work handled by the work flow system can be increased.

To attain the first object there is also provided a work flow system comprising: entry means for allocating a work point to each of persons in charge who belong to a respective one of a plurality of domains; division means for dividing work originating in each domain into a plurality of work points; definition means for defining the execution sequence of work points for the work by a work flow; work flow server means for managing the execution of the work flow for each of the domains, each of the domains; organization management means, provided for each of the domains, for storing an organization flow which consists of work points that belong to the corresponding domain and is made open to another domain and organization information; work flow server entry means for storing a plurality of pieces of organization information containing domains each of which belong to a respective one of organizations and specifying information specifying each of the domains; product information sending means, provided for each of the domains, for, when detecting organization information in the process of executing a work flow originating in the corresponding domain, reading the domain that belongs to a corresponding organization from the work flow server entry means and sending a product of the current work point with organization information for the corresponding organization appended to the domain read; and organization flow executing means, provided for each of the domains, for, when receiving product information specifying the corresponding domain, searching the corresponding organization management means using organization information contained in the product information for the corresponding organization flow and executing it.

In the work flow system thus configured, the organization management section of each domain stores an organization flow which is made open to the other domain and consists of its own work points.

Further, the work flow server entry section stores a plurality of pieces of organization information containing the names of domains to which the organizations entered into the organization management sections of the respective domains belong and identification information for identifying the work flow servers of the respective domains.

An operator can create two types of flow: general flow consisting of work points which belong to the same domain; and flow which incorporates not only work points which belong to the same domain but also an organization which is stored in the organization management section and made open to the other domain.

The work flow server in each domain, when detecting an organization in the process of executing a flow originated in it, reads the domain to which that organization belongs from the work flow server entry section and then sends to that domain product information having information about the organization added to a product at the current execution phase.

The domain that received the folder information searches its organization management section by the organization information contained in the product information and creates a flow for that organization. Since the organization management section stores an organization flow which is made open to the other domain, the organization flow can be recreated easily. The recreated flow contains only work points which belong to the corresponding domain, permitting the recreated organization flow to be carried out easily.

To achieve the second object, the work flow system is added with an interserver management section into which the received product information is written by a domain that received the product information, and product location tracing means, provided for each of the domains, which is responsive to an product location tracing command entered after the transmission of the product information to detect, through the interserver management section, the current location of the product in the domain to which the product information has been sent.

When a product location tracing command is entered into a domain, which created a flow, in the state in which the flow has progressed to the organization, the domain can detect the organization flow and the current product location from the work flow server to which the product information has been sent.

To achiever the third object, the work flow system is further provided, for each domain, with a backup memory which stores the same contents as the work flow server entry section and transmission backup means which identifies the domain to which the product information has been sent on the basis of the stored contents of the backup memory in the event of abnormality in the work flow server entry section.

With such a configuration, in the event that abnormality has occurred in the work flow server entry section for some reason, the domain to which product information has been sent can be identified on the basis of the stored contents of the backup memory. Thus, the organization flow can be carried out normally in the other domain.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a simplified schematic block diagram of a work flow system according to a first embodiment of the invention;

FIG. 2 shows the stored contents of the work flow server in the system of FIG. 1;

FIG. 6 shows the names of public flows of one domain and the other domain stored in the interdomain flow management sections in the system of FIG. 1;

FIG. 7 shows a process flow in one domain in the system of FIG. 1;

FIG. 9 shows a process flow in the domains in the system of FIG. 1;

FIG. 13 shows organization flow definition and entry procedures in the system of FIG. 10;

FIG. 19 shows a state in which a file to be sent to an organization has been created in the work flow server when the flow proceeds to the next point (WP3);

FIG. 21 shows the state in which the contents of a reception folder in the other domain have been placed in the interserver management section;

FIG. 23 is a simplified schematic block diagram of a work flow system according to a third embodiment of the invention;

FIG. 24 is a schematic representation of a conventional work flow system; and

FIG. 25 shows a flow consisting of only work points belonging to the same domain.

DETAILED DESCRIPTION OF THE PREFERRED EMBODIMENTS

Figure 3:
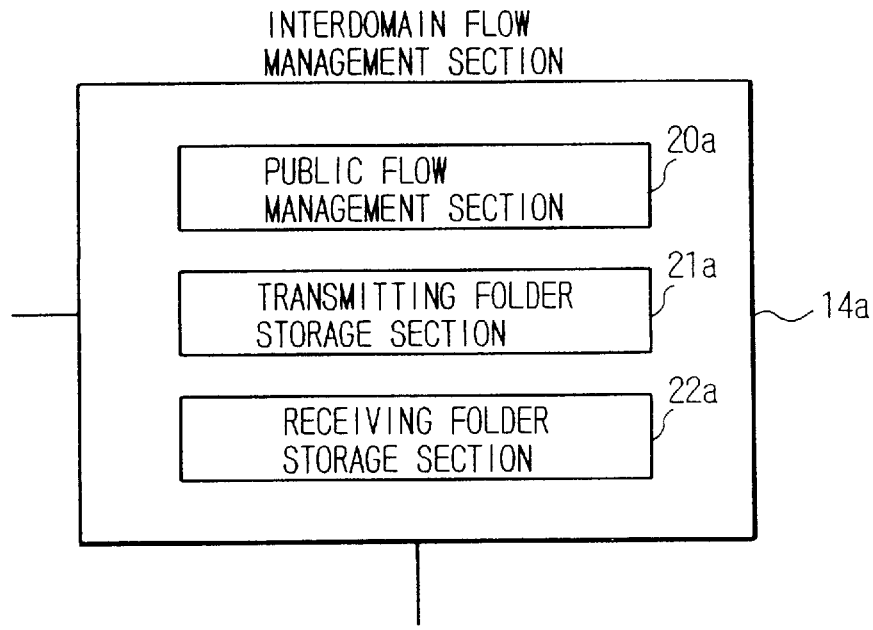
FIG. 3 shows the configuration of the interdomain flow management section in the system of FIG. 1.

Hereinafter, the invention will be described with reference to the drawings.

FIG. 1 is a schematic representation of a work flow system according to a first embodiment of the invention.

The work flow system comprises two domains 11a and 11b which are named domain A and domain B, respectively. The domains 11a and 11b are interconnected by a network 12 such as a local area network (LAN). Each of the domains indicates a section or department as a unit and, in practice, it consists of an information processing unit such as a workstation.

As shown, each of the domains 11a and 11b comprises a work flow server 13a, 13b which actually performs execution management of flow, an interdomain flow management section 14a, 14b which performs public-flow management between domains, a client function section 15a, 15b through which an operator enters a flow indicating various tasks by way of example, and a visual display section 16a, 16b which visually displays input flow and a folder representing the result of execution of the flow.

Though not shown in FIG. 1, work points 2a (WP1, WP2, WP3, . . . ), 2b (WP1, WP2, WP3, . . . ) as shown in FIG. 24 are connected to the corresponding work flow server 13a, 13b in the same domain.

As shown in FIG. 2, the work flow server 13a includes a person-in-charge-of-work-point table 17a indicating a relationship of work points 2a (WP1, WP2, WP3, . . . ) to persons a1, a2, . . . in charge of these work points, a work point sequence table 18a which stores the execution sequence of the work points 2a constructing a work flow (flow name: A, flow ID: A) specified by the client function section 15a, and a folder location memory 19a which stores the current location of a folder (product) of the specified work flow.

The other work flow server 13b is also provided with like tables and a like memory.

As shown in FIG. 3, the interdomain flow management section 14a (14b) contains a public flow management section 20a (20b), a transmitting folder storage section 21a (21b) which stores a folder that is being transmitted to the other domain 11b (11a ), and a receiving folder storage section 22a (22b) which stores a folder received from the other domain 11b (11a).

In the public flow management section 20a (20b) is stored a public flow which is formed of work points 2a (2b) in the associated domain 11a (11b) and which is made open to the other domain 11b (11a). Specifically, as shown in FIG. 6, the management section stores a public flow 23a (23b) consisting of work points 2a (2b), each of which is allocated individually a person in charge in the associated domain 11a (11b), and a public flow name 24a (24b) which identifies that public flow.

The public flow management section 20a (20b) stores a relationship of the flow name 24b of a public flow in the other domain 11b (11a) to the name of a domain 11b (11a) to which that public flow belongs.

In the work flow system thus configured, for example, when an operator enters through the client function section 15a in the one domain 11a a work flow consisting of multiple work points indicating a task and its name, they are displayed to the display section 16a and sent to the work flow server 13a.

The work flow server 13a enters the work flow and the flow name into the work point sequence table 18a and the folder location memory 19a, respectively, shown in FIG. 2. If the received work flow consists of only work points 2a in the same domain 11a as shown in FIG. 25, then the work flow server 13a will operate in the same way as the work flow server 4a in the conventional work flow system shown in FIG. 24 without giving any command to the interdomain flow management section 14a. That is, the work flow server 13a activates each of the work points in the sequence set up in the work point sequence table 18a, forwards a folder to the next work point at the termination of processing at one work point, and writes a work point at which that folder currently locates, i.e., the current location of that folder, into the folder location memory 19a.

Figure 4:
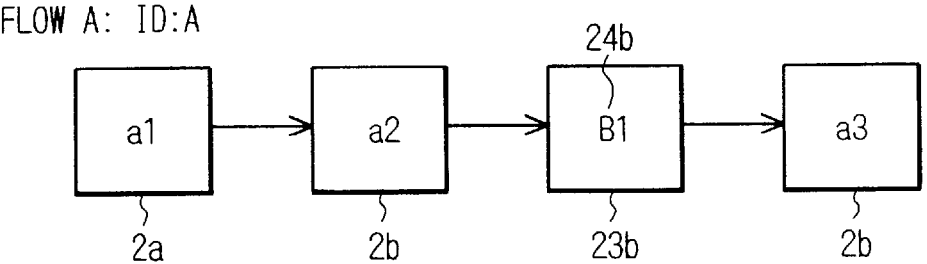
FIG. 4 shows a flow created in the system of FIG. 1.

If, on the other hand, the received work flow consists, as shown in FIG. 4, of the work points 2a in the same domain 11a and the public flow 24b (flow name: B1) made open by the other domain 11*b*, then the work flow server 13*a* causes the persons in charge to carry out processing at the work points WP1 (person in charge: a1) and WP2 (person in charge: a2), writes the flow name B1 into the folder location memory 19*a* upon acquiring a folder A after the termination of processing at the work point WP2, and forwards the folder A to the interdomain flow management section 14*a* with the public flow B1 specified, as shown in P1 (program step) of FIG. 7. Specifically, the folder A is forwarded with an identifier, an identification code, or the flow name B1 used to identify the appended public flow B.

The interdomain flow management section 14*a* identifies the public flow name B1 by the folder A received from the work flow server 13*a* and then identifies the domain 11*b* corresponding to the flow name B1 by the contents set in the public flow management section 20*a* (P2).

Next, in P3, the interdomain flow management section 14*a* stores the folder A received from the work flow server 13*a* into the transmitting folder storage section 21*a* along with the name B of the domain to which the folder is directed. Further, in P4, the interdomain flow management section 14*a* sends the folder A with the flow name B1 identifying the appended public flow B1 to the interdomain flow management section 14*b* in the other domain 11*b* (domain B) over the network 12.

Figure 8:
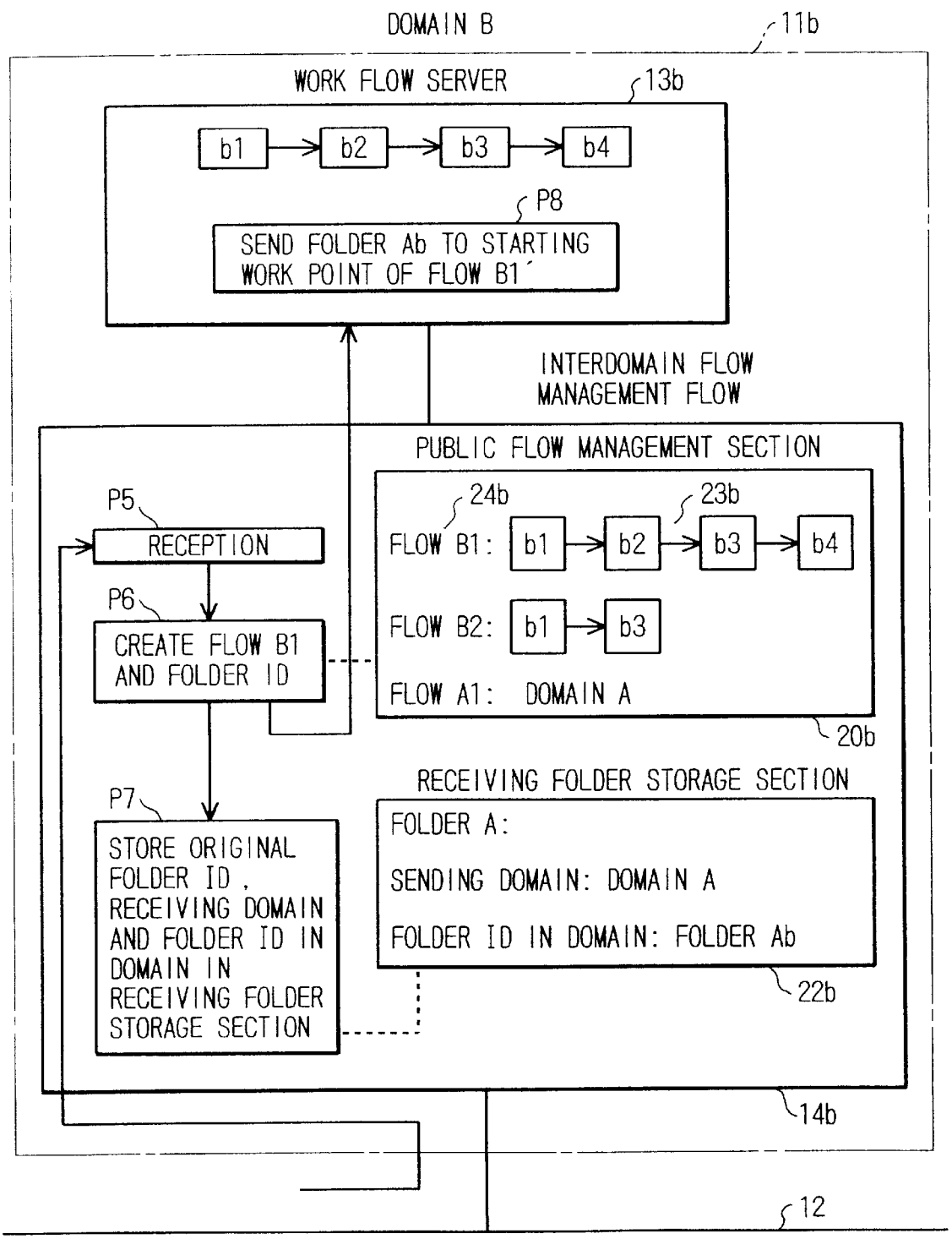
FIG. 8 shows a process flow in the other domain in the system of FIG. 1.

As shown in FIG. 8, the interdomain flow management section 14*b* in the domain 11*b* receives the folder A with the appended flow name B1 from the domain 11*a* (P5). The procedure goes to P6 in which a flow not public flow-consisting of only work points 2*b* in the domain 11*b* is created on the basis of the flow name B1 appended to the received folder A.

Specifically, the interdomain flow management section 14*b* reads the public flow 23*b* corresponding to the flow name B1 from the associated public flow management section 20*b* and makes this public flow a normal flow, which is then forwarded, with a new flow name B1' attached, to the work flow server 13*b*. In addition, a folder ID (name) for the new flow named B1' and a folder Ab (value) are also created and then sent to the work flow server 13*b*.

At the same time, in P7, the received original folder A and the folder ID and the folder Ab which have been newly defined are stored in the receiving folder memory section 22*b*. At this point, the sending domain name A is also stored.

Upon termination of the above preparations, the work server 13*b* in the domain 11*b* enters the flow B1' received from the interdomain flow management section 14*b* into the work point sequence table 18*b* and then activates each of the work points 2*b* in the sequence set in the work point sequence table 18*b*. At the termination of processing at one work point 2*b*, the server forwards the folder Ab to the next work point 2*b* and writes the work point where the folder currently locates into the folder location memory 19*b*. In this embodiment, the flow B1' is carried out in the order of b1, b2, b3, and b4.

At the termination of processing of the flow B1', the work server 13*b* in the domain 11*b* forwards the folder Ab thus obtained to the interdomain flow management section 14*b* in P9 shown in FIG. 9.

In P10, the interdomain flow management section 14*b* retrieves the same folder Ab in the receiving folder storage section 22*b*. When the folder Ab is retrieved, the interdomain flow management section returns the identifier of the folder Ab to the original identifier A stored in the receiving folder storage section 22*b* (P11). That is, the folder A is updated to the value after the execution of the public flow B1. The folder is then sent to the sending domain 11*a* over the network 12. The interdomain flow management section 14*b* deletes data on a folder Ab already sent in the receiving folder memory section 22*b*.

The interdomain flow management section 14*a* in the domain 11*a* receives the folder A from the domain 11*b* (P13). Further, it searches the transmitting folder storage section 21*a*, removes data for the stored folder A from the storage, and then sends the received folder A to the work flow server 13*a* (P14).

Upon receipt of the folder A from the interdomain flow management section 14*a*, the work flow server 13*a* in the domain 11*a* extracts from the work point sequence table 18*a* the work point 2*a* which is next to a work point where the folder A currently locates. In this case, the public flow name B1 is stored in the folder location memory 19*a*. The folder A is sent to the extracted work point 2*a* to activate it.

In this way, the work flow server 13*a* executes the flow A including the public flow, set up by the operator on the side of the domain 11*a*, up to the last work point 2*a* (WP3).

Figure 5:
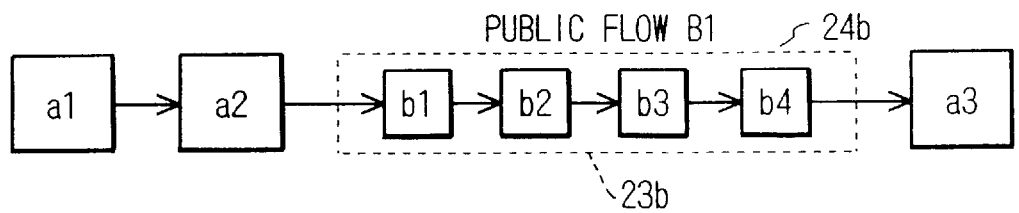
FIG. 5 shows a flow execution sequence in the system of FIG. 1.

FIG. 5 shows the execution sequence of the work points 2*a* and 2*b* in the flow A by the domains 11*a* and 11*b*, which contains the public flow 23*b* of FIG. 4 and is entered from the client function section 15*a* of the domain 11*a*.

In the work flow system thus configured, each of the domains 11*a* and 11*b* defines a public flow that consists of its work points and is made open to the other domain and stores it in the corresponding public flow management section along with the flow name of a public flow defined by the other domain.

Therefore, when a flow for work that originated is created by an operator in the client function section in each of the domains 11*a* and 11*b*, task assignment to the work points 2*a* and 2*b* in the different domains 11*a* and 11*b* can be made easily by incorporating not only its work points but also a public flow in the other domain into the work flow.

Consequently, the kinds and scale of work that is handled by each of the domains 11*a* and 11*b* can be increased with no need to increase work points and persons in charge to be entered into the work flow servers 13*a* and 13*b* and with each domain individually allowed to execute a flow consisting of only its own work points.

Information that is transmitted over the network 12 between the domains 11*a* and 11*b* contains only a folder to which the flow name of a public flow is appended. That is, there is no need to send the public flow contents themselves.

The domain which received that folder is required only to carry out the public flow that corresponds to the received flow name stored in it. That is, there is no need to reconfigure the flow in the receiving domain. As a result, the incorporation of the public flow function into the conventional work flow system shown in FIG. 24 will not considerably reduce the efficiency of processing work flow entered from the client function section.

Note that the above-described embodiment is merely exemplary. Although the embodiment was described as comprising two domains, three or more domains can be used. In this case, each domain will store in its public flow management section the flow names of public flows in the other domains as well as its public flow. If public flows entered into multiple domains are of the same function, which public flow is to be used depends on previously established priority or a selecting algorithm.

As described above, the work flow system according to the first embodiment of the invention is configured such that each domain stores a public flow that is made open to a different one and can direct the different one to carry out its own public flow.

Therefore, even if a work flow is created for work that originated in one domain in such a way as to incorporates work points of another domain, each domain can carry out its work flow efficiently. This permits the kinds and scale of work handled by the system to be increased significantly and moreover permits each piece of work to be carried out efficiently without reducing work flow server's processing efficiency.

Figure 10:
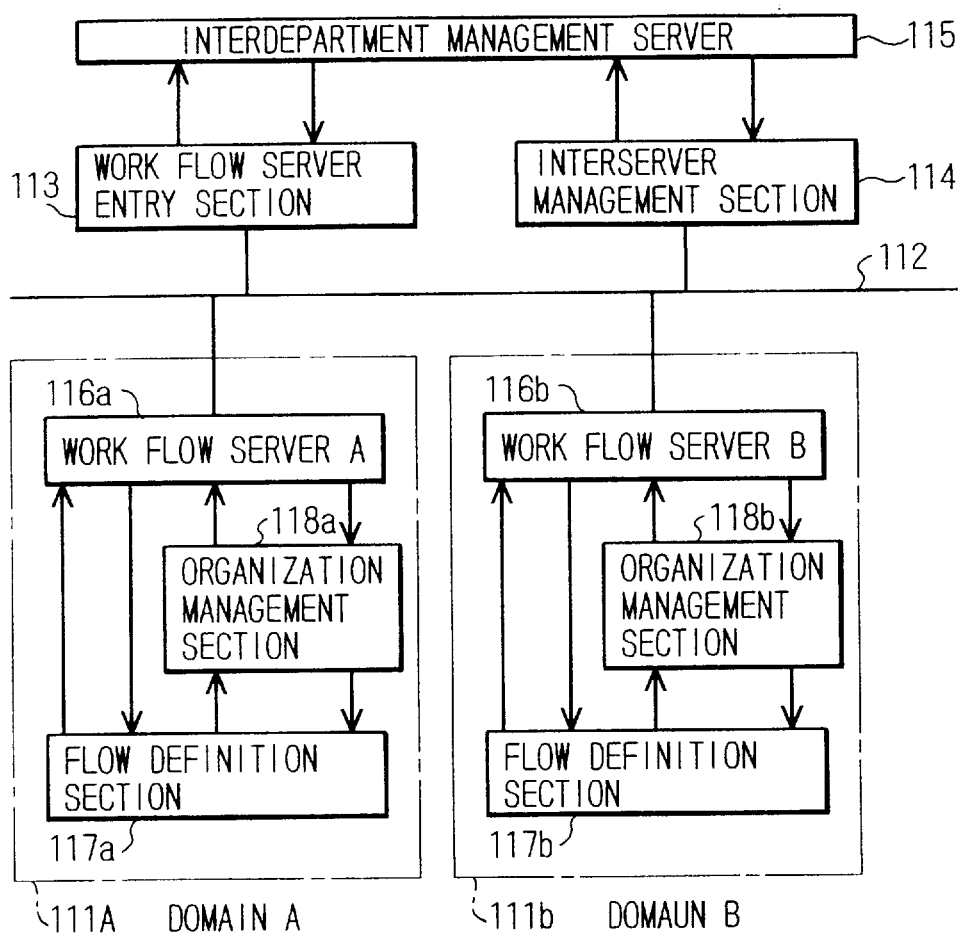
FIG. 10 is a block diagram of a work flow system according to a second embodiment of the invention.

Referring now to FIG. 10, there is shown in block diagram form a work flow system according to a second embodiment of the invention, in which, as in the first embodiment, two domains 111a and 111b, named domain A and domain B, are interconnected by a network 112 such as a LAN. Each domain refers to one organization such as a section or department in enterprises, government offices, or the like.

Moreover, a work flow server entry section 113 and an interserver management section 114 are coupled to the network 112.

To the work flow server entry section 113 and the interserver management section 114 is connected an interdepartment management server 115, which manages information exchanges between the domains 111a and 111b on the basis of the stored contents of the work flow server entry section 113 and the interserver management section 114.

Each of the domains 111a and 111b is provided with a work flow server 116a (116b) which manages work points 2a (2b) and users that belong to it, the execution of input work flow, and folders created at execution phases of the flow, a flow definition section 117a (117b) on which an operator creates work flow, and an organization management section 118a (118b) which, of work flows defined on the flow definition section 117a (117b), stores organization flow that is made open to the other domain 111b (111a). In this case, the organization indicates a unit consisting of work points within one domain such as a section or department.

Figure 11:
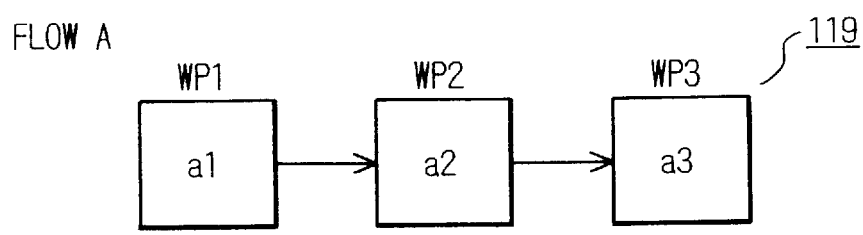
FIG. 11 shows a general flow composed of only work points within the same domain and entered into the system of FIG. 10.

Into the flow definition section 117a of the domain 111a is entered general flow 119 consisting of only work points 2a (WP1, WP2, WP3) that belong to that domain as shown in FIG. 11. The flow is entered in a state where the work points WP1, WP2 and WP3 are allocated persons in charge a1, a2 and a3, respectively.

Figure 12:
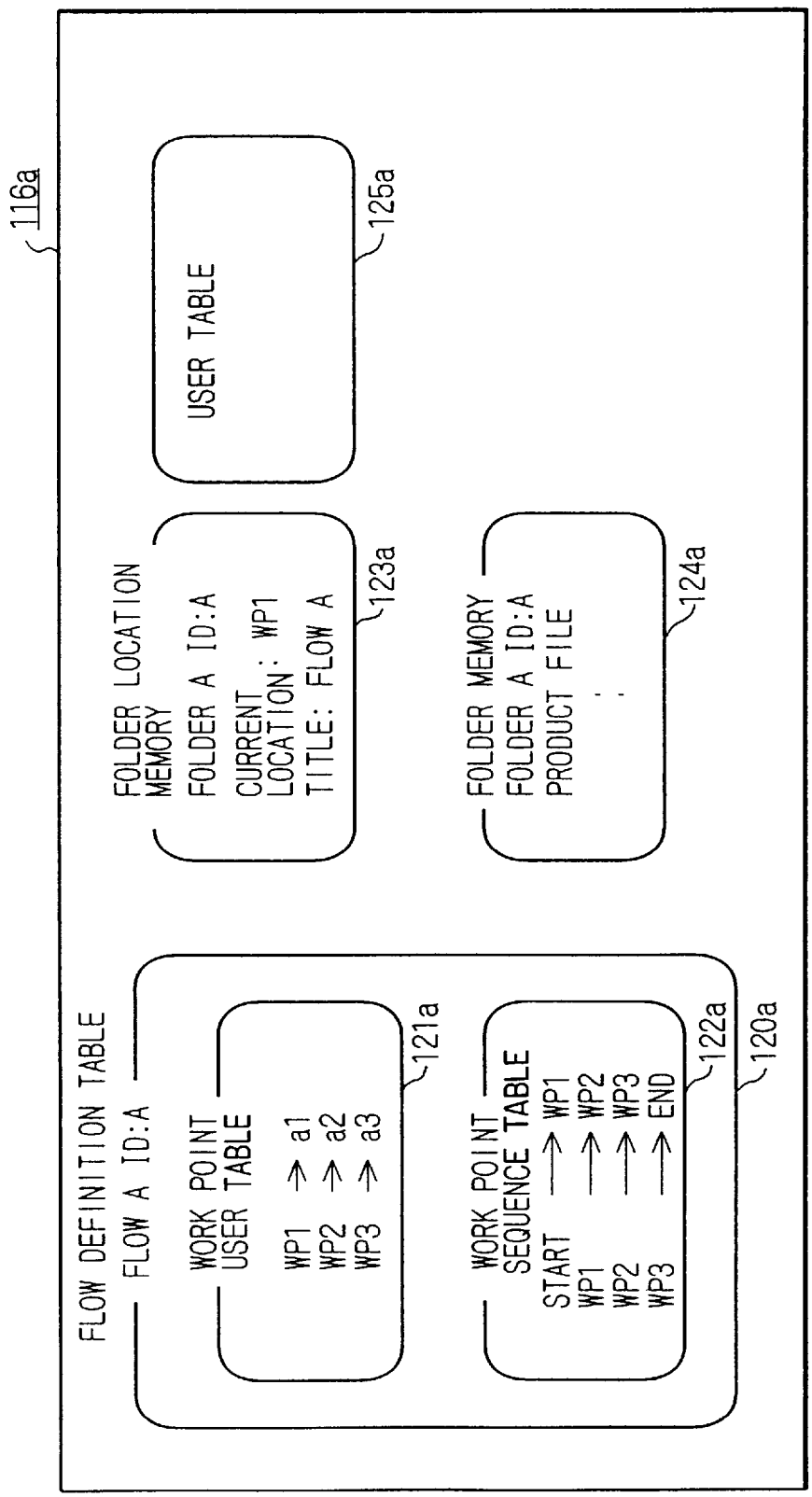
FIG. 12 shows the stored contents of the work flow server in the system of FIG. 10.

The work flow server 116 contains a flow definition table 120a related to general flow 119 defined on the flow definition section 117a as shown in FIG. 12. Further, the flow definition table 102a contains a work point user table 121a which stores users a1, a2 and a3 allocated to the work points 2a (WP1, WP2, WP3) forming the flow 119 and a work point sequence table 122a which stores the execution sequence of the work points in that flow.

The work flow server 116a further contains a folder location memory 123a which stores the name, ID (identification code) and title of a folder in the flow that is in current execution, a folder memory 124a which stores the products contained in the folder, and a user table 125a which stores the users a1, a2 and a3 entered into the domain 111a.

Figure 14A:
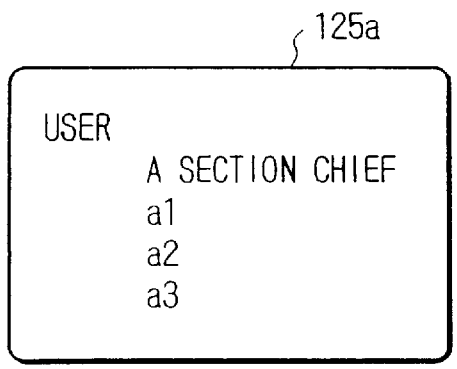
FIG. 14A shows a user table formed in one work flow server in the system of FIG. 10.

In the exemplary system, in the domain 111a for organization A consisting of one section, the A section chief and three other users a1, a2 and a3 are entered into the user table 125a as shown in FIG. 14A.

The work flow server 116b of the other domain 111b also includes a flow definition table 120b comprising a work point user table 121b and a work point sequence table 122, a folder location memory 123b, a folder memory 124b, and a user table 125b.

Figure 14B:
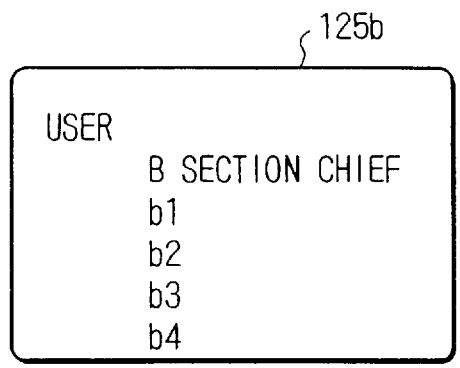
FIG. 14B shows a user table formed in the other work flow server in the system of FIG. 10.

In the domain 111b for organization B, the B section chief and four other users b1, b2, b3 and b4 are entered into the user table 125b as shown in FIG. 14B.

As shown in FIG. 13, the organization management section 118a (118b) in each work flow server stores the flow of organization A (B) defined by an operator on the flow definition section 117a (117b) and organization information. Specifically, the organization name, an organization accept tray indicating a directory that accommodates a created folder and the organization flow are entered into the management section.

In the exemplary system, in the organization A of the domain 111a, the name of the organization is "organization A" and the flow of the organization is indicated by the sequence of users as a1 - a2 - a3. In the organization B of the domain 111b, the organization name is "B section ** in charge" and the organization flow is indicated by the sequence of users as b1 - B section chief.

Into the work server entry section 113 which is accessible by the work flow servers 116a and 116b in the domains 111a and 111b are entered the addresses of the respective work flow servers 116a and 116b on the network 112 used in transmitting folder information. Further, the organization names for identifying the organizations A and B, the work server names and organization information on accept trays and the like are also entered into the work server entry section 113.

Figure 15:
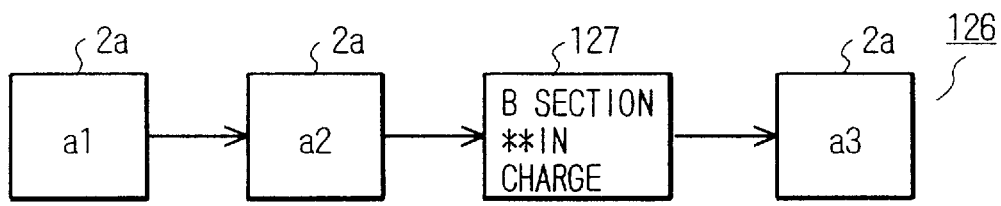
FIG. 15 shows a flow having a built-in organization flow which is to be entered into the system of FIG. 10.
Figure 20:
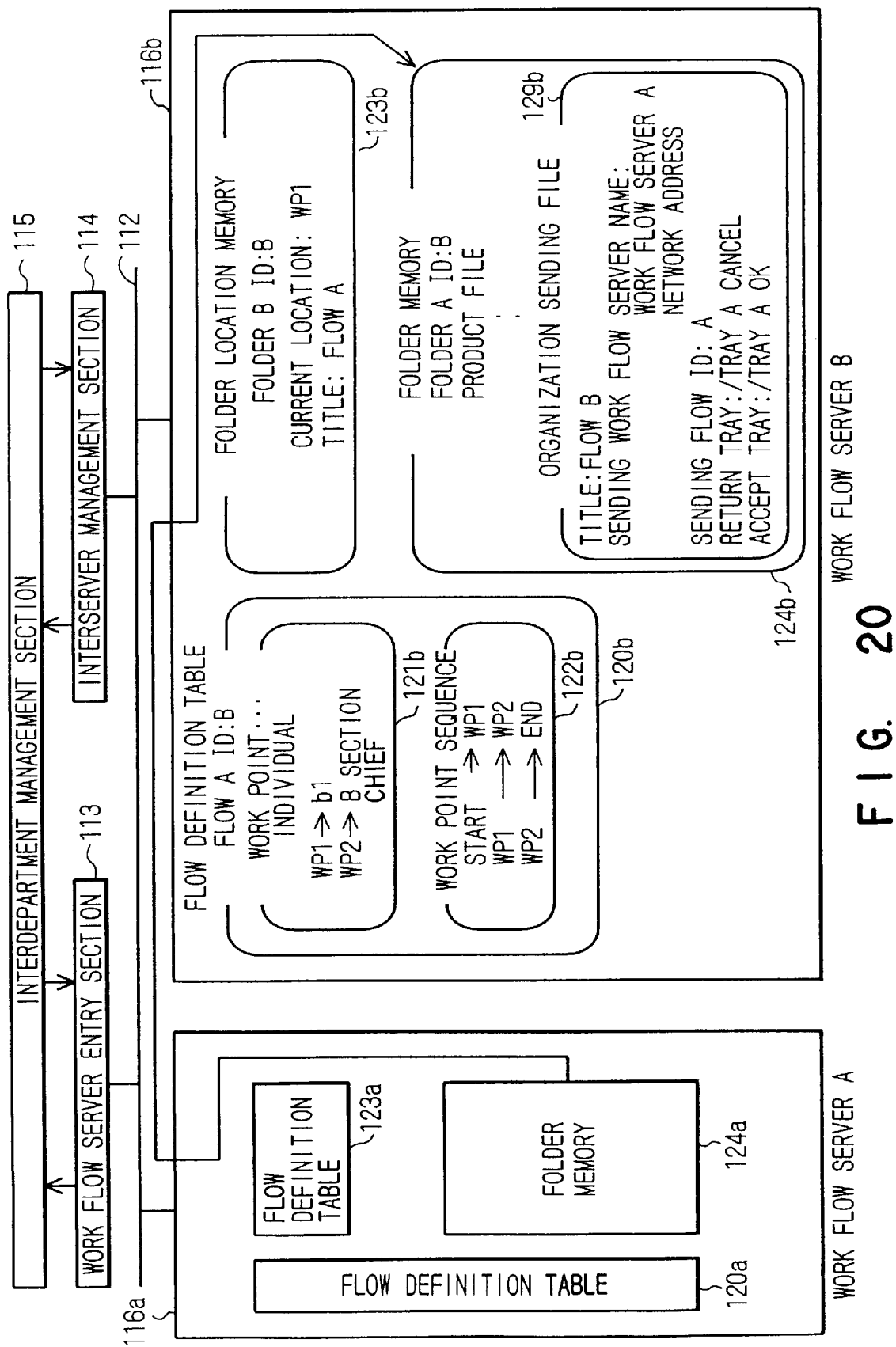
FIG. 20 shows a state in which the file to be sent to the organization has been sent to the other work flow server.

The interserver management section 114, which is accessible by the work flow servers 116a and 116b in the domains 111a and 111b, stores temporarily the original information of a flow 126 containing organization extending over the domains 111a and 111b as shown in FIG. 15 when that flow 127 is in current execution and the organization flow 128 is in current execution. Specifically, as shown in FIGS. 20 and 21, the original information to be stored in the interserver management section is the contents of an organization sending file 129a (129b) that is sent to the organization flow executing work flow server 116b (116a) and then stored in the folder memory 124b (124a).

This file also stores the name of the sending work flow server, the flow name, a return tray (a directory that receives a folder when folder information is returned), and an accept tray (a directory that accepts folder information when the organization flow is terminated normally).

The stored information in the interserver management section 114 is used when the work flow server that has sent folder information wants to know the current location of the folder in the domain to which the folder information has been sent.

In the work flow system thus configured, when the operator enters organization flow and organization information via the flow definition section, they are stored in the corresponding organization management section and part of the information is entered into the common work flow server entry section 113.

For example, the work flow server 116a enters flow inputted from the flow definition section 117a into the flow definition table 120a and places such various pieces of information about the flow as described above into the folder location memory 123a and the folder memory 124a.

When a work flow set up is, for example, the general flow 119 that consists of only work points 2a in the domain 111a as shown in FIG. 11, the work flow server 116a, like the work flow server 4a in the conventional work flow system shown in FIG. 24, activates each of the work points 2a (WP1, WP2, WP3) in the sequence set in the work point sequence table 122a in the flow definition table 120a shown in FIG. 12, forwards, at the termination of processing one work point, a folder that contains a product obtained at that time to the next work point, and updates the contents of the folder memory 124a to those of that folder. Further, it updates the current location of the folder stored in the folder location memory 123a to the next work point.

If, for example, the set work flow is the flow 126 containing the work points 2a in the domain 111a and an organization 127 made open by the other domain 111b as shown in FIG. 15, then the third work point WP3 in the work point user table 121a in the flow definition table 121a of the work flow server 116a is set to the organization name "B section ** in charge".

Figure 16:
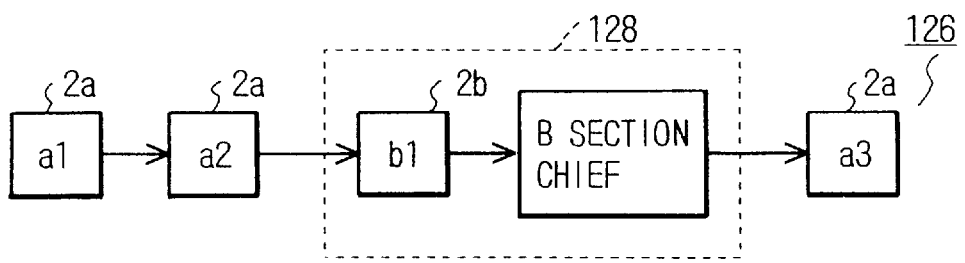
FIG. 16 shows the execution sequence of a flow with a built-in organization flow in the system of FIG. 10.
Figure 17:
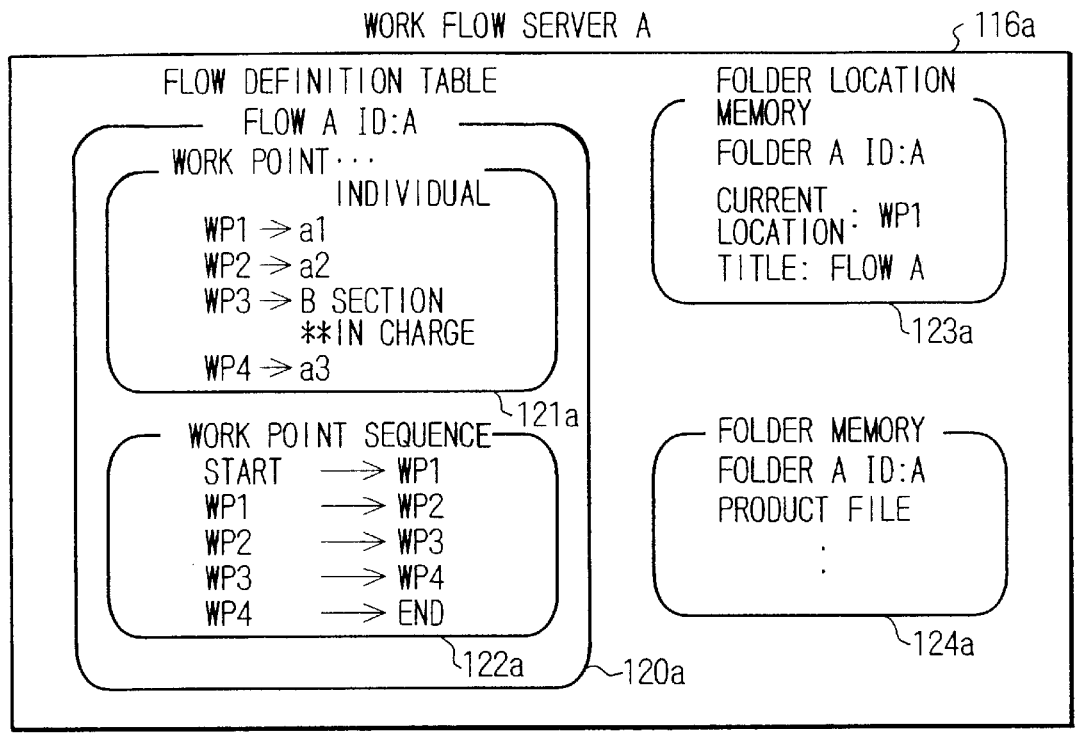
FIG. 17 shows the stored contents of one work flow server immediately after the start of flow (at WP1) in the system of FIG. 10.

The actual flow of the organization named "B section ** in charge", which has been set up in the organization management section 118b, means circularization of a folder from the user b1 to the B section chief as shown in FIG. 16.

Figure 18:
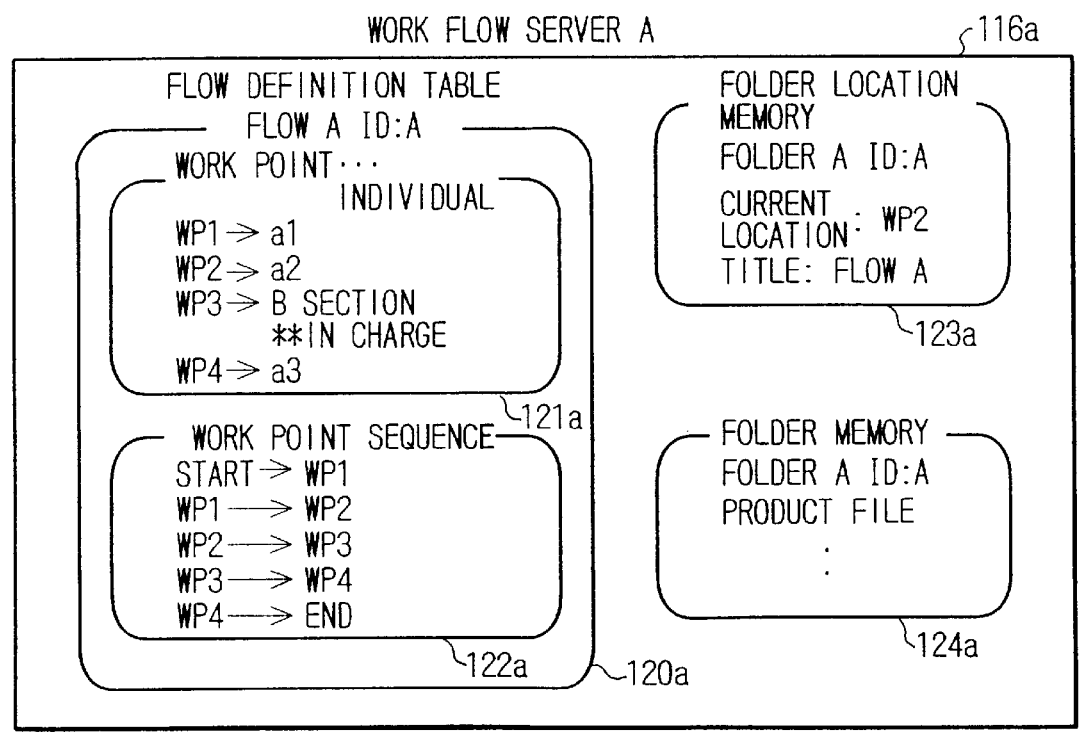
FIG. 18 shows the stored contents of the work flow server when the flow has progressed to a certain point (WP2)

In this case, the work flow server 116a carries out the flow 126 in accordance with the sequence set in the work point sequence table 122a. The stored contents of the flow definition table 120a, the folder location memory 123a and the folder memory 124a immediately before the folder is forwarded from the user a2 allocated to the work point WP2 will become as shown in FIG. 18. The folder current location in the folder location memory 123a indicates the work point WP2.

When, in this state, the user a2 forwards the folder to the next work point WP3, the folder current location in the folder location memory 123a is updated to the work point WP3 as shown in FIG. 19. After updating it is thus required to forward the folder to the user at the work point WP3. Since the work point WP3 is allocated the organization "B section  in charge" in the work point user table 121a, the folder is sent to the organization "B section  in charge".

The work flow server 116a sends the folder to the organization of the other domain in accordance with the following procedure.

First, as shown in FIG. 19, the server 116a incorporates into the folder memory 124a the flow name "flow A" in the folder location memory 123a, the sending work flow server name (its name), its network address, the sending flow ID, and information about "return tray" and "accept tray" as a file 129a bound for organization.

Next, the server 116a acquires the acceptance tray of the organization "B section  in charge" from the work flow server entry section 113 in the interdepartment management server 115 and then copies the folder information stored in the folder memory 124a into the accept tray for the organization "B section  in charge" in the receiving work flow server 116b in the domain 111b as shown in FIG. 20. Thus, as can be seen from FIG. 20, the stored contents of the folder memory 124b in the work flow server 116b of the domain 111b become identical to those of the folder memory 124a in the work flow server 116a of the domain 111a shown in FIG. 19. At the termination of transmission, the contents of the folder memory 124a in the work flow server 116a are deleted.

The work flow server 116b in the domain 111b creates work flow to be carried out by that domain from the received folder information. Specifically, the server 116b identifies organization flow stored in the organization management section from the accept tray for the received folder information and places the organization flow and the organization information into the flow definition table 121b and the work point sequence table 122b under the name of flow A. In addition, the initial work point WP1 of the organization flow is placed into the folder location memory 122b. Thus, this flow will become a general flow consisting of only work points that belong to the domain 111b.

At the termination of creation of the flow, as shown in FIG. 21, the work flow server 116b enters the sending work flow server name, the sending flow ID, the return tray, the accept tray, the receiving work flow server name, and the receiving flow ID, which are contained in the received folder information stored in the organization sending file 129b in the folder memory 124b.

At the termination of initialization of the flow of the organization "B section ** in charge", the work flow server 116b carries out that flow set up in the flow definition table 120b as usual.

Figure 22:
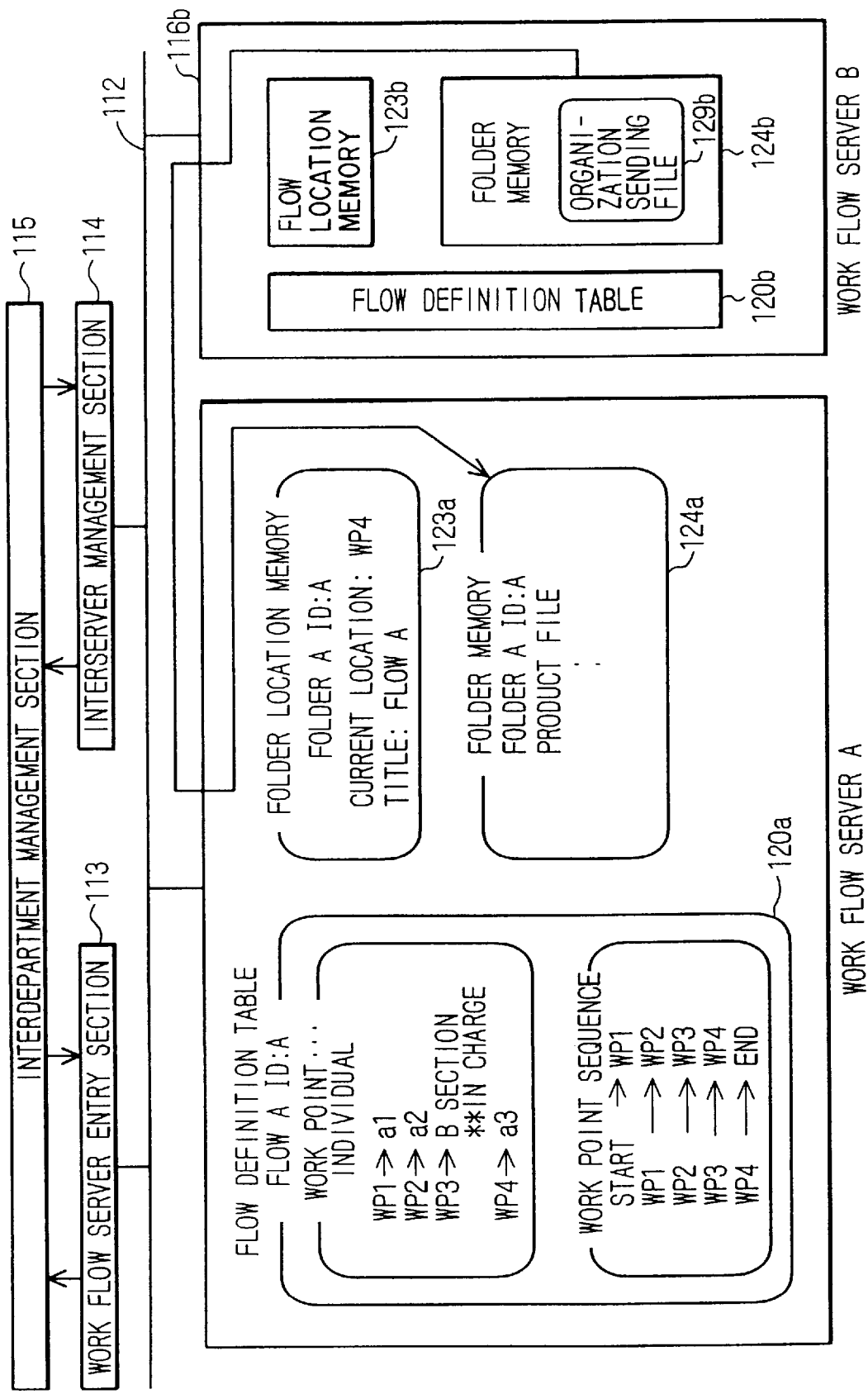
FIG. 22 shows the state in which the organization flow has ended in the other domain and the folder has been returned to the sending domain.

When the flow set up in the flow definition table 120b is terminated normally, the work flow server 116b retrieves the sending work flow server name and the accept tray from the information about the sending work flow server 116a stored in the organization sending file 129b in the folder memory 124b as shown in FIG. 22. Then, the server 116b copies (returns) the folder information in the folder memory 124b into the accept tray of the sending work flow server 116a of the domain 111a. In this case, the organization sending file 129b is not sent, but only the folder entities containing a product file are returned.

Thus, the folder after the termination of the organization flow of the domain 111b will have been stored in the folder memory 124a of the work flow server 116a of the domain 111a.

The work flow server 116a that received the folder information deletes stored information in the interserver management section 114 of the interdepartment management server 115.

The work flow server 116a then advances the current folder location in the folder location memory 123a from the work point WP3 for the organization "B section ** in charge" to the next work point WP4.

After that, the general flow is restarted in accordance with the sequence set up in the work point sequence table 122a of the flow definition table 120a.

Thus, the execution of the work flow 126 (refer to FIG. 15) containing the organization flow 128 of the other domain 111b, which has been entered from the flow definition section 117a of the domain 111a, is terminated normally.

If, for example, there is an inadequacy in the contents at the first work point WP1 of the organization flow to be executed by the domain 111b and so the folder is returned to the previous work point, then the work flow server 116b copies (returns) the folder into the work flow server 116a of the sending domain 111a by the same processing. In this case, in the work flow server 116a, the folder is copied into the return tray, not into the accept tray.

Upon receipt of the folder into the return tray, the work flow server 111a deletes information entered into the interserver management section 114 of the interdepartment management server 115, then returns the folder current location in the folder location memory 123a to the previous state and forwards the received folder from the other work flow server 116b to the user allocated to the previous work point WP, thereby restarting the implementation of the flow.

Further, the work flow server is placed in the stopped state during an interval the folder is forwarded to and placed in the other work flow server while the flow is being executed. It is possible during this interval to use the information stored in the interserver management section 114 of the interdepartment management section 115 to trace where the folder is now located in which organization.

If, for example, the flow 126 shown in FIG. 15 has been entered from the flow definition section 117a of the domain 111a and the folder has been forwarded from the work flow server 116a to the work flow server 116b, the sending work flow server 111a performs the following processing to locate the folder. Note that, in the interval when the folder is placed in the work flow server 116b, information in the organization sending file 129 forwarded to the work flow server 116b is stored in the interserver management section 114.

First, the work flow server 116a makes a request to the interdepartment management server 115 for information about the receiving end to which the work flow server name and the flow ID are sent from the sending server 116a. The interdepartment management server 115 then searches the interserver management section 114 by the work flow server name and the flow ID of the sending end to acquire the work flow server name and the flow ID of the receiving end. The interdepartment management server 115 obtains flow information specified by the flow ID from the receiving work flow server 116b and then sends that flow information to the requesting work flow server 116a.

As a result, the sending work flow server 116a can know the current location of the folder from the flow information of the receiving work flow server 116b obtained from the interdepartment management server 115.

According to the work flow system thus configured, in each of the domains 111a and 111b, an organization flow that consists of its own work points and is made open to the other domain is defined and held in its organization management section. And a part of the organization flow and specified information including the addresses of the respective work flow servers 116a and 116b on the network are entered into the work flow server entry section 113 common to the domains 111a and 111b.

Thus, by, at the time when, in each of the domains 111a and 111b, an operator creates a flow for work in its flow definition section 117a or 117b, incorporating not only its work points but also work points in the other domain into the work flow, work allocation to the work points in the other domain can be made easily.

Consequently, the kinds and scale of work to be handled by each domain can be increased without increasing work points and persons in charge to be entered into the work flow servers 116a and 116b of the domains 111a and 111b and with each domain allowed to independently carry out work flow consisting of only its own work points.

Further, the provision of the interserver management section 114 that is accessible in common allows the folder current location to be grasped easily and the progress of flow to be grasped when necessary even in the interval the flow in execution has been shifted to work points in the other domain by the function of an organization.

As described above, the work flow system according to the second embodiment of the invention is provided with a management server which defines organization flow which consists of only work points in one domain which is made open to the other domain and manages work flow which extends over the domains.

Therefore, even if work flow is created in such a way as to incorporate into part of work that originated in one domain work to be carried out by the other domain, the work flow can be carried out efficiently by each domain and the kinds and scale of work handled by the system can be increased significantly.

Moreover, even if flow is in execution in the other domain, its progress can be grasped easily.

FIG. 23 is a simplified schematic block diagram of a work flow system according to a third embodiment of the invention.

In this figure, like reference numerals are used to denote corresponding parts to those in the second embodiment shown in FIG. 10 and description thereof is omitted.

In this exemplary system, the work flow server of each domain is provided with a flow definition table 120a (120b), a folder location memory 123a (123b), a folder memory 124a (124b), a user file 125a (125b), and a backup memory 130a (130b).

The backup memory 130a (130b) stores the same contents as the work flow server entry section 113.

When need arises to send folder information from the work flow server 116a to the other work flow server 116b in the event that the work flow server entry section 113 does not operates properly for some reason, the folder information can be sent from the backup memory 130a to the accept tray in the work flow server 116b and copied into it.

Thus, even when the interdepartment management server 115 does not operate properly, flow can be carried out properly between the domains 111a and 111b using organization.

Thus, in the work flow system according to the third embodiment, since the stored contents of the work flow server entry section are also stored in the backup memories, work flow can be carried out as properly as possible even at the time of the occurrence of abnormality, increasing the reliability of the whole system.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A work flow system comprising:

entry means for allocating a work point to each of persons in charge who belong to each of a plurality of domains;

division means for dividing work originating in each domain into a plurality of work points;

definition means for defining the execution sequence of work points for said work by a work flow; and management means for managing the execution of said work flow for each of said domains, each of said domains comprising:

a public flow management section for storing a public flow consisting of its own work points, said public flow being made open to the other domains;

product information sending means for, upon detecting a public flow which consists of work points that belong to another domain in the process of executing a work flow originated in it, sending a product at the current work point with identification information for said public flow to a domain to which work points forming said public flow belong;

product information receiving means for receiving product information sent from another domain and containing identification information for a public flow consisting of its work points; and public flow executing means for executing said public flow identified by said identification information contained in said product information received by said product information receiving means.

2. The system according to claim 1, wherein each of said domains further comprises product information return means for sending products obtained by said public flow executing means back to a domain that sent said product information to it; and flow execution sending means for sending a product returned from another domain to the next work point in said work flow to thereby restart said work flow.

3. The system according to claim 2, wherein a person in charge is entered for each of said work points constituting said public flow.

4. The system according to claim 2, wherein a product, such as a document, a drawing, or a program, as the result of execution of each work point is incorporated into a folder, said folder being transmitted between work points and between domains.

5. The system according to claim 4, wherein said identification information for said public flow is a flow name containing the name of a domain to which said public flow belongs and is incorporated into said folder for transmission to a domain to which work points of said public flow belong.

6. The system according to claim 5, wherein each of said domains further comprises a transmitting folder storage section for storing a folder which has been sent to another domain but is not returned yet, a receiving folder storage section for storing a folder which has been received from another domain but is not returned yet, and a folder location memory for storing a work point at which a current folder is located.

7. A work flow system comprising:

entry means for allocating a work point to each of persons in charge who belong to a respective one of a plurality of domains;

division means for dividing work originating in each domain into a plurality of work points;

definition means for defining the execution sequence of work points for said work by a work flow;

work flow server means for managing the execution of said work flow for each of said domains;

organization management means, provided for each of said domains, for storing an organization flow which consists of work points that belong to the corresponding domain and is made open to another domain and organization information;

work flow server entry means for storing a plurality of pieces of organization information containing domains each of which belong to a respective one of organizations and specifying information specifying each of said domains;

product information sending means, provided for each of said domains, for, when detecting organization information in the process of executing a work flow originating in the corresponding domain, reading the domain that belongs to a corresponding organization from said work flow server entry means and sending a product of the current work point with organization information for the corresponding organization appended to said domain read; and organization flow executing means, provided for each of said domains, for, when receiving product information specifying the corresponding domain, searching the corresponding organization management means using organization information contained in said product information for the corresponding organization flow and executing it.

8. The system according to claim 7, wherein each of said domains further comprises product information returning means for returning a product obtained by said organization flow execution means to a domain that sent said product information and work flow execution restarting means for sending a product returned from another domain to the next work point in said work flow.

9. The system according to claim 8, wherein a product, such as a document, a drawing, or a program, as the result of execution of each work point is incorporated into a folder for transmission between work points and between domains.

10. The system according to claim 9, wherein said organization information contains the name of the corresponding organization, the name of a domain which belongs to the corresponding organization and an organization accept tray for receiving said folder.

11. The system according to claim 9, wherein each of said domains further comprises a folder location memory for storing the work point in the corresponding domain at which the current folder is located.

12. The system according to claim 9, wherein each of said domains further comprises a folder memory for storing a folder containing said product and said organization information to be sent to another domain and a folder received from another domain.

13. The system according to claim 9, further comprising interserver management means into which said product information received by said domain is written, and product location tracing means, provided for each of said domains, for detecting, through said interserver management means, the current location of said product in a domain to which said product has been transmitted in response to a command to trace the location of said product after the transmission of said product.

14. The system according to claim 9, further comprising a backup memory, provided for each of said domains, for storing the same contents as said work flow server entry means, and transmit backup means for identifying a domain to which said product information is transmitted on the basis of the stored contents of said backup memory at the time of occurrence of abnormality in said work flow server entry means.

* * * * *